US009886595B2

(12) United States Patent
Kwag et al.

(10) Patent No.: US 9,886,595 B2
(45) Date of Patent: Feb. 6, 2018

(54) PRIORITY-BASED APPLICATION EXECUTION METHOD AND APPARATUS OF DATA PROCESSING DEVICE

(71) Applicant: Samsung Electronics Co., Ltd., Suwon-si, Gyeonggi-do (KR)

(72) Inventors: Kyungsoo Kwag, Suwon-si (KR); Jaemin Ryu, Yeongwol-gun (KR); Jungkyuen Lee, Suwon-si (KR); Kyungim Jung, Seongnam-si (KR); Hyunjin Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 618 days.

(21) Appl. No.: 14/097,921

(22) Filed: Dec. 5, 2013

(65) Prior Publication Data

US 2014/0165216 A1 Jun. 12, 2014

Related U.S. Application Data

(60) Provisional application No. 61/734,545, filed on Dec. 7, 2012.

(30) Foreign Application Priority Data

Feb. 26, 2013 (KR) .................. 10-2013-0020209

(51) Int. Cl.
G06F 21/62 (2013.01)
G06F 21/74 (2013.01)
(Continued)

(52) U.S. Cl.
CPC ............ G06F 21/629 (2013.01); G06F 9/468 (2013.01); G06F 9/4843 (2013.01); G06F 21/74 (2013.01); G06F 21/83 (2013.01)

(58) Field of Classification Search
None
See application file for complete search history.

(56) References Cited

U.S. PATENT DOCUMENTS 7,849,310 B2 * 12/2010 Watt ...................... G06F 9/3012
713/150
7,949,866 B2 5/2011 Watt et al.
(Continued)

FOREIGN PATENT DOCUMENTS

| EP | 2 124 165 A2 | 11/2009 |
|---|---|---|
| KR | 10-2010-0093695 A | 8/2010 |
| WO | 2008/086456 A2 | 7/2008 |

OTHER PUBLICATIONS

Sharp et al., Extending Hardware Based Mandatory Access Controls for Memory to Multicore Architecture, University of Tennessee, ACM © 2008, 3 pages.*

(Continued)

*Primary Examiner* — Jeffrey Pwu
*Assistant Examiner* — Baotram Tran
(74) *Attorney, Agent, or Firm* — Jefferson IP Law, LLP

(57) ABSTRACT

A method and an apparatus for executing applications in a highest-priority-first order in the processor divided into a secure mode area and a non-secure mode area are provided. The method includes receiving a request to be processed in the non-secure mode domain from the application, determining an access permission level configured to a resource used for processing the request, determining, when the access permission level allows for access from the secure mode domain, a priority of the application, changing the access permission level to allow for access by the non-secure mode domain according to the priority of the application, and processing the request of the application using the resource in the non-secure mode domain.

16 Claims, 8 Drawing Sheets

(51) Int. Cl.
*G06F 21/83* (2013.01)
*G06F 9/46* (2006.01)
*G06F 9/48* (2006.01)

(56) References Cited

U.S. PATENT DOCUMENTS

| | | | |
|---|---|---|---|
| 8,713,567 B2* | 4/2014 | Gehrmann | G06F 9/445 718/1 |
| 8,949,844 B2* | 2/2015 | Williams | G06F 9/5077 711/117 |
| 9,152,223 B2* | 10/2015 | Cohn | G06F 3/01 |
| 2004/0139346 A1 | 7/2004 | Watt et al. | |
| 2005/0097341 A1* | 5/2005 | Francis | G06F 21/10 713/189 |
| 2005/0204155 A1* | 9/2005 | Ravi | G06F 21/575 726/22 |
| 2007/0113079 A1* | 5/2007 | Ito | G06F 9/468 713/166 |
| 2007/0192830 A1* | 8/2007 | O'Connor | G06F 21/6218 726/2 |
| 2008/0092145 A1* | 4/2008 | Sun | G06F 12/1441 719/312 |
| 2008/0184274 A1* | 7/2008 | Ohta | G06F 9/485 719/319 |
| 2008/0209212 A1 | 8/2008 | Ditzman et al. | |
| 2008/0294848 A1* | 11/2008 | Harris | G06F 12/084 711/141 |
| 2009/0183009 A1* | 7/2009 | Delfs | G06F 21/74 713/193 |
| 2009/0254986 A1* | 10/2009 | Harris | G06F 21/74 726/17 |
| 2009/0264117 A1 | 10/2009 | Hsieh et al. | |
| 2009/0307770 A1* | 12/2009 | Harris | G06F 11/3644 726/22 |
| 2009/0328008 A1* | 12/2009 | Mital | G06F 11/3612 717/129 |
| 2011/0093750 A1* | 4/2011 | Williams | G06F 9/5077 714/47.2 |
| 2011/0107426 A1* | 5/2011 | Yen | G06F 9/468 726/26 |
| 2011/0162078 A1* | 6/2011 | Taveau | G06F 21/445 726/26 |
| 2011/0219373 A1* | 9/2011 | Nam | G06F 9/455 718/1 |
| 2011/0314538 A1* | 12/2011 | Huang | G06F 21/62 726/19 |
| 2012/0023573 A1* | 1/2012 | Shi | G06F 3/04883 726/17 |
| 2012/0102557 A1* | 4/2012 | Felton | G06F 21/64 726/7 |
| 2012/0331550 A1* | 12/2012 | Raj | G06F 21/53 726/22 |
| 2013/0047197 A1* | 2/2013 | Saroiu | G06F 21/6209 726/1 |
| 2013/0054473 A1* | 2/2013 | Jan | G06Q 20/40975 705/71 |
| 2014/0115693 A1* | 4/2014 | Schieman | G06F 21/53 726/17 |
| 2014/0201548 A1* | 7/2014 | Gallet | G06F 1/3203 713/320 |

OTHER PUBLICATIONS

Song et al., Enhancing Source-Level Programming Tools with An Awareness of Transparent Program Transformation, ACM © 2009, 19 pages.*

Suh et al., Design and Implementation of the AEGIS Single-Chip Secure Processor Using Physical Random Functions, IEEE © 2005, 12 pages.*

Ravi et al., Tamper Resistance Mechanism for Secure Embedded Systems, IEEE © 2004, 7 pages.*

Petrescu et al., Secure Workflow Execution in Grid Environments, IEEE © 2009, 5 pages, 12 pages.*

* cited by examiner

PRIORITY-BASED APPLICATION EXECUTION METHOD AND APPARATUS OF DATA PROCESSING DEVICE

CROSS-REFERENCE TO RELATED APPLICATION(S)

This application claims the benefit under 35 U.S.C. § 119(e) of a U.S. provisional patent application filed on Dec. 7, 2012 in the U.S. Patent and Trademark Office and assigned Ser. No. 61/734,545, and under 35 U.S.C. § 119(a) of a Korean patent application filed on Feb. 26, 2013 in the Korean Intellectual Property Office and assigned Serial No. 10-2013-0020209, the entire disclosure of each of which is hereby incorporated by reference.

TECHNICAL FIELD

The present disclosure relates to a method and an apparatus for executing an application in a priority order in a data processing device. More particularly, the present disclosure relates to a method and an apparatus for executing applications in a highest-priority-first order in a processor divided into a secure mode area and a non-secure mode area.

BACKGROUND

Typically, a data processing device includes a processor configured to execute loaded applications under the control of an Operating System (OS). In a case where a specific application is executed by the processor, it is needed to guarantee security on the resource of the data processing device in association with the corresponding application.

For example, in a case of applications needing a security key to perform validation, authentication, and decryption process, the data processed with the input of the security key has to be stored in a secure region of the memory so as to be protected from the access of malware, such as a hacking application, and also preventing the security key input process from hooking attack by operating the input means, such as a keypad in a secure mode.

As an example of resource security, a TrustZone architecture of ARM secures the hardware resource using a processor supporting non-secure mode domain (normal world) and secure mode domain (secure world). For example, the non-secure mode domain and the secure mode domain are separated in hardware so as to reinforce security.

More specifically, the legacy OSs (such as Linux, Android, and iOS) are running in the non-secure mode domain and the framework and applications are running under the control of the OS. Since the non-security region is vulnerable to the malware attack, it is risky to perform highly security-sensitive operations.

Meanwhile, in the secure mode domain, the legacy OSs and framework operations are restricted and separated from the non-secure mode domain in hardware so as to avoid a security problem caused by the malware programs of the related art. In the secure mode domain, it is possible to use the resource of System On Chip (SoC) and other hardware resources and, by configuring the permission level of the corresponding resource to 'secure' in response to a certain application, it becomes impossible to access and use the corresponding resource although there is a request from an application in the non-secure mode domain.

Accordingly, although an application attempting access to a secure resource for processing any urgent process in the non-secure mode domain in the state that the resource permission level is set to 'secure' in the secure mode domain, it is impossible to access or use the corresponding resource as far as the permission level to the corresponding resource is not change.

Therefore, a need exists for a method and an apparatus for allowing a non-secure mode domain to use the resource of the secure mode domain in response to an application with high priority in a data processing device equipped with a process having the secure mode domain and the non-secure mode domain.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for allowing a non-secure mode domain to use a resource of the secure mode domain in response to an application with high priority in a data processing device equipped with a process having the secure mode domain and the non-secure mode domain.

In accordance with an aspect of the present disclosure, a method for executing an application with a processor supporting a secure mode domain and a non-secure mode domain is provided. The method includes receiving a request to be processed in the non-secure mode domain from the application, determining an access permission level configured to a resource used for processing the request, determining, when the access permission level allows for access from the secure mode domain, a priority of the application, changing the access permission level to allow for access by the non-secure mode domain according to the priority of the application, and processing the request of the application using the resource in the non-secure mode domain.

In accordance with another aspect of the present disclosure, an apparatus for executing an application with a processor supporting a secure mode domain and a non-secure mode domain is provided. The apparatus includes a non-secure mode controller configured to receive a request to be processed in the non-secure mode domain from the application and process, when an access permission level allows for access from the secure mode domain and an access permission response is received in response to a request for access to a resource, the request of the application using the resource in the non-secure mode domain and a mode switching controller configured to determine, when the access permission level allows for access from the secure mode domain, a priority of the application, change the access permission level to allow for access by the non-secure mode domain according to the priority of the application, and transmit the access permission response to the non-secure mode controller.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the description is directed to a mobile terminal, such as a tablet Personal Computer (PC) and a smartphone equipped with an ARM based processor of based, it is obvious to those skilled in the art that the subject matter of the present disclosure is applicable to other terminals implemented with similar technology with various modifications and changes without departing from the spirit and scope of the disclosure.

Figure 1:
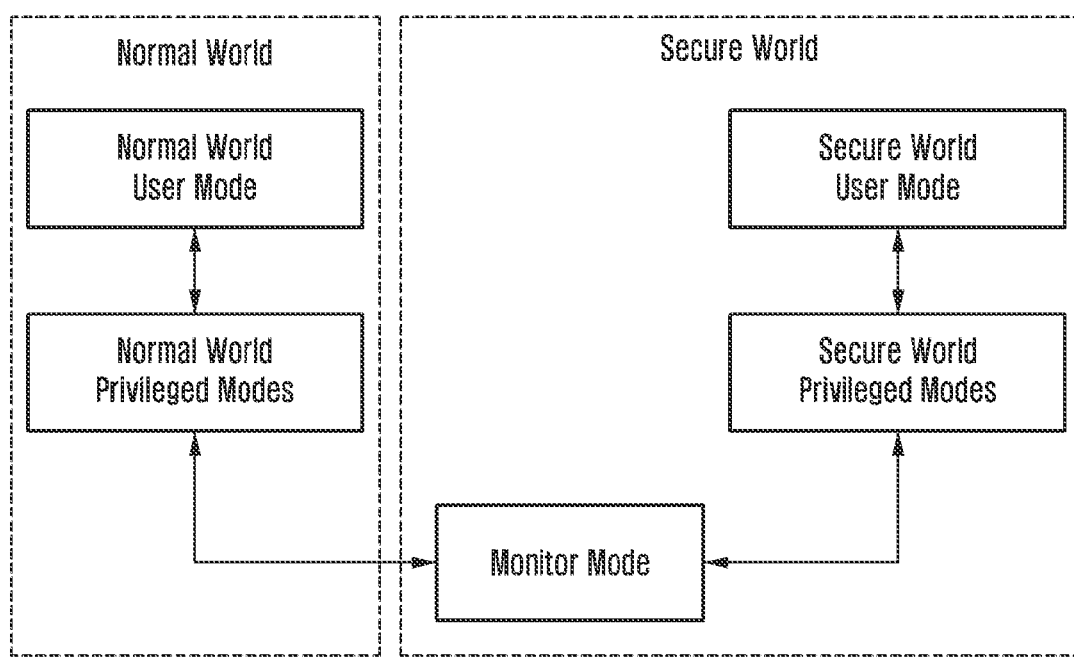
FIG. 1 is a block diagram illustrating a hardware configuration of a TrustZone provided by an ARM based processor according to an embodiment of the present disclosure.

FIG. 1 is a block diagram illustrating a hardware configuration of a TrustZone provided by an ARM based processor according to an embodiment of the present disclosure. The TrustZone system divides all hardware and software resources into normal world as the non-secure mode domain and secure world as the secure mode domain to achieve security.

Referring to FIG. 1, the normal world includes a normal world user mode and a normal world privileged mode, and the secure world includes a secure world user mode and a secure world privileged modes. Additionally, a monitor mode is configured to switch between two virtual processors.

An application execution method and apparatus is applicable to the processor operating in the secure and non-secure mode domains separately like TrustZone.

Figure 2:
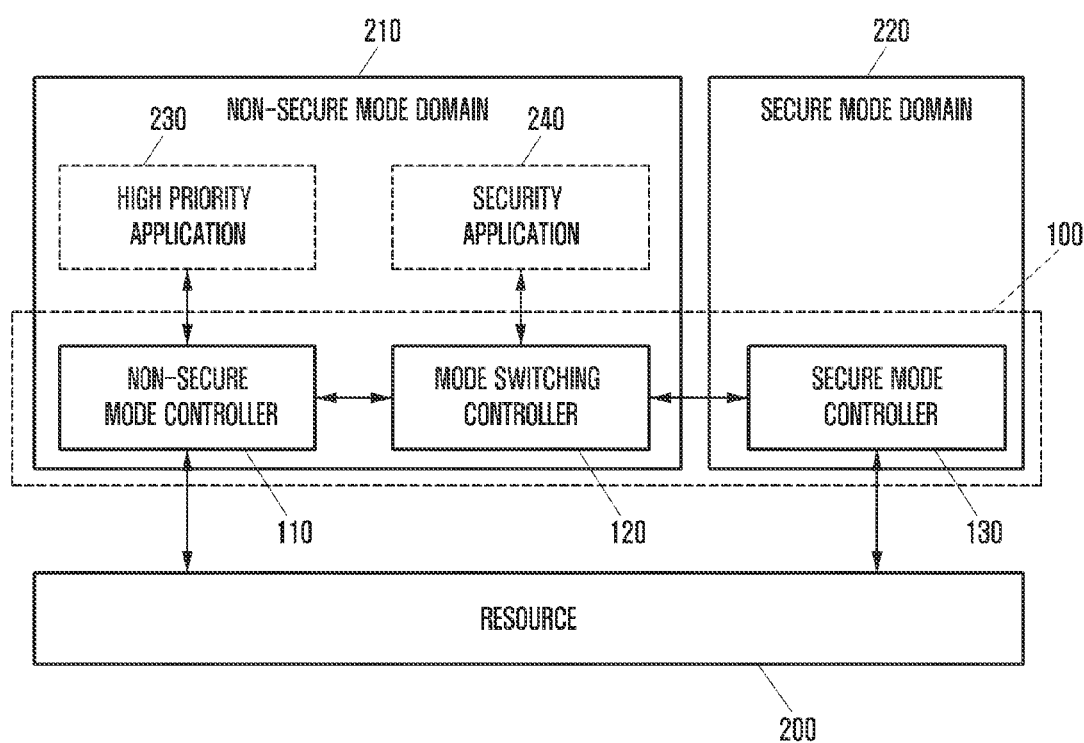
FIG. 2 is a block diagram illustrating a configuration of an application execution apparatus according to an embodiment of the present disclosure

FIG. 2 is a block diagram illustrating a configuration of an application execution apparatus according to an embodiment of the present disclosure.

Referring to FIG. 2, an application execution apparatus 100 includes a non-secure mode controller 110, a mode switching controller 120, and a secure mode controller 130. These components may be implemented in the form of a recording medium for storing the software executable by the processor structured as shown in FIG. 1.

The non-security mode controller 110 operates in a non-security mode domain 210 of the processor and accesses a resource 200 to process the request of a high priority application 230 which is not security-sensitive but needed to be processed urgently.

Although not shown in FIG. 2, the non-secure mode controller 110 operates in the non-secure mode and processes the request of a low priority normal application. The request of the normal application is not processed until the resource occupied by the high priority application 230 or a security application 240 is released.

The mode switching controller 120 operates in the non-secure mode domain 210 of the processor between the non-secure mode controller 110 executing applications in the non-secure mode and the secure mode controller 130 executing applications in the secure mode. The mode switching controller 120 also transfers the request of the secure application 240 for processing in a secure state to the secure mode controller 130 such that the secure mode controller 130 accesses the resource 200 to process the request.

The secure mode controller 130 processes the request of the secure application which is transferred by the mode switching controller 120 and changes the access permission level to the resource 200. The access permission level of the resource for use in execution of the application is initialized to the level accessible from the non-secure mode domain 210. Accordingly, in order for the secure mode controller 130 to process the request of the security application 240, it is necessary for the secure mode controller 130 to change the access permission level to the level allowing for access from a secure mode domain 220.

The secure mode controller 130 changes the access permission level of the resource 200 to a level allowing for access from the secure mode domain 220 and another level allowing for access from the non-secure mode region 210 as an initial state. The secure mode controller 130 notifies the mode switching controller 120 of the change result, and the mode switching controller 120 notifies the non-secure mode controller 110 of the change result to inform the non-secure mode controller 110 that the resource can be used for processing the application running in the non-secure mode.

A description is made of an embodiment of the procedure of executing the high priority application needing access to the resource occupied by the security application 240.

Suppose a situation where an incoming call is received in a state where a financial transaction application is running on a smartphone with the use of an input means, such as a touch keypad for receiving a password and an authentication number, such that the telephony application as the high priority application 230 is executed with the necessity of access to the input means for receiving a command for accepting or rejecting the incoming call.

In the method of the related art, although it is necessary to input a command through the input means for accepting or rejecting the incoming call, the telephony-related input is not transferred to the telephony application because the input means is preoccupied by the security application 240. The present disclosure proposes a method for processing the security application 240 with priority by reflecting its high priority needing urgent processing although the telephone application is not needed to be processed in the secure mode.

Figure 3:
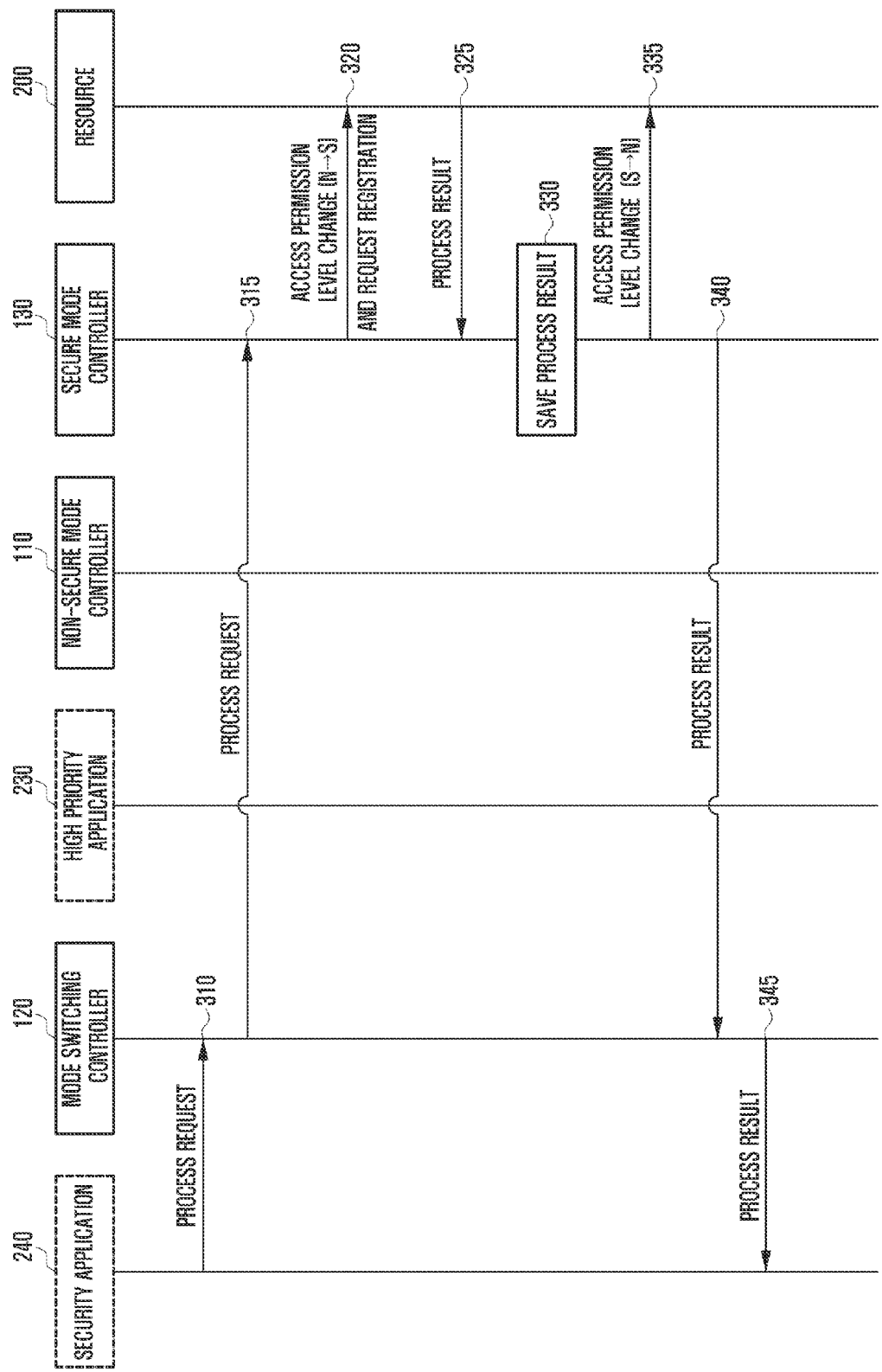
FIG. 3 is a signal flow diagram illustrating a procedure of processing a request of a security application in a state where no high priority application is running in an application execution method according to an embodiment of the present disclosure.
Figure 4:
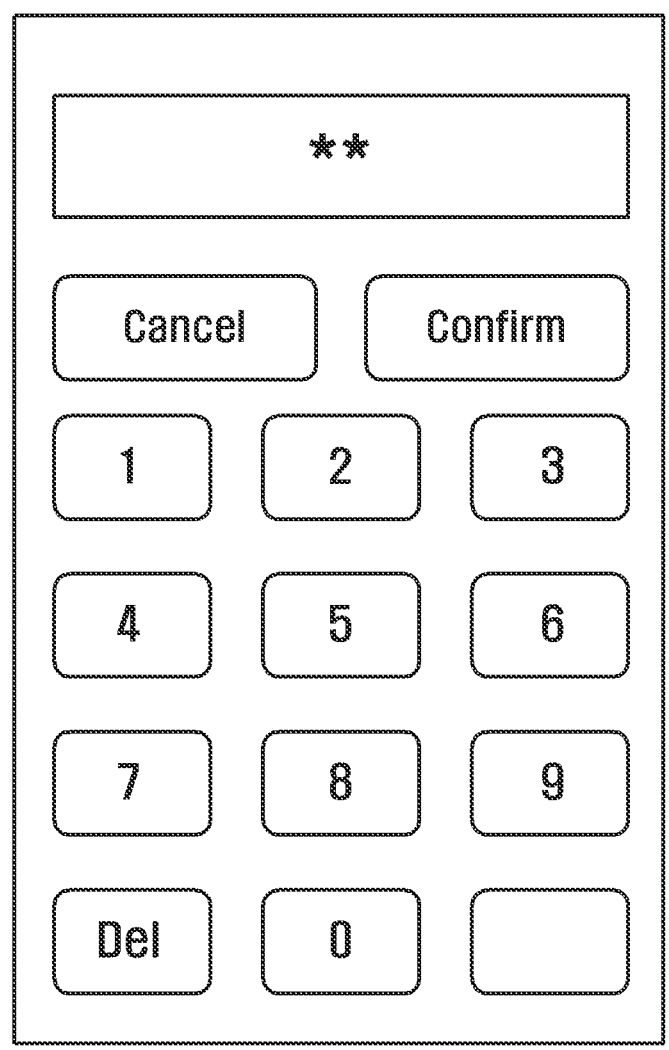
FIG. 4 is a diagram illustrating a screen display of a touch keypad User Interface (UI) for receiving key input in a secure mode according to an embodiment of the present disclosure.

FIG. 3 is a signal flow diagram illustrating a procedure of processing a request of a security application in a state where no high priority application is running in an application execution method according to an embodiment of the present disclosure. FIG. 4 is a diagram illustrating a screen display of a touch keypad User Interface (UI) for receiving key input in a secure mode according to an embodiment of the present disclosure.

Referring to FIGS. 3 and 4, the mode switching controller 120 receives a process request of the security application at operation 310 and sends the process request to the secure mode controller 130 at operation 315.

If the resource 200 used for executing the security application 240 is a touch input means, the process request of the security application 240 may include the type of needed input, e.g., a position of a key input, a drag path, a number of touch inputs, and the like.

Since the request of the security application 240 has to be processed in the secure mode, the secure mode controller 130 changes the access permission level of the resource to be used for execution of the security application 240 from the non-secure mode (N) to the secure mode (S) and registers the process request of the security application 240 with the resource 200 at operation 320. In an embodiment of the present disclosure, the secure mode controller 130 may configure the position information on the keys of the input means, as shown in FIG. 4, in itself or receive the key position information from the security application 240 when registering the process request with the resource 200.

The secure mode controller 130 receives the process result of the resource 200 at operation 325 and stores the process result at operation 330. If the resource 200 is the touch keypad as shown in FIG. 4, the process result from the resource 200 may include a touch position, a time between touch start and end times, and a difference between the touch start and end points. The process result is stored in the secure region of the memory so as to be protected from other applications running in the non-secure mode or a malware attack.

Once the process for processing the request of the security application 240 has completed, the secure mode controller 130 changes the access permission level of the resource 200 to the non-secure mode accessible level (N) at operation 335 and notifies the mode switching controller 120 that the request of the security application 240 has been processed at operation 340.

In a case where the process request received from the security application 240 at operation 310 is made through a plurality of touch inputs, the process of operations 315 to 340 corresponds to a process for processing a one touch input. If there is any request of the security application 240 to be processed after the receipt of the process result from the secure mode controller 130, the mode switching controller 120 resends the secure mode controller 130 the process request to perform operations 315 to 340 again. If it is determined that all the requests of the security application have been processed, the mode switching controller 120 sends the process result to the security application 240 at operation 345.

If the high priority application 230 is executed to generate a process request before the process of the security application 240 of FIG. 3 is completed, the legacy non-secure mode controller 110 is restricted an access to the resource 200 so as to wait until the process of the security application is processed completely or the request of the high priority application 230 is cancelled. In an embodiment of the present disclosure, the process of the security application 240 is suspended to process the high priority application 230 by taking notice that the process of the high priority application 230 is urgent.

Figure 5:
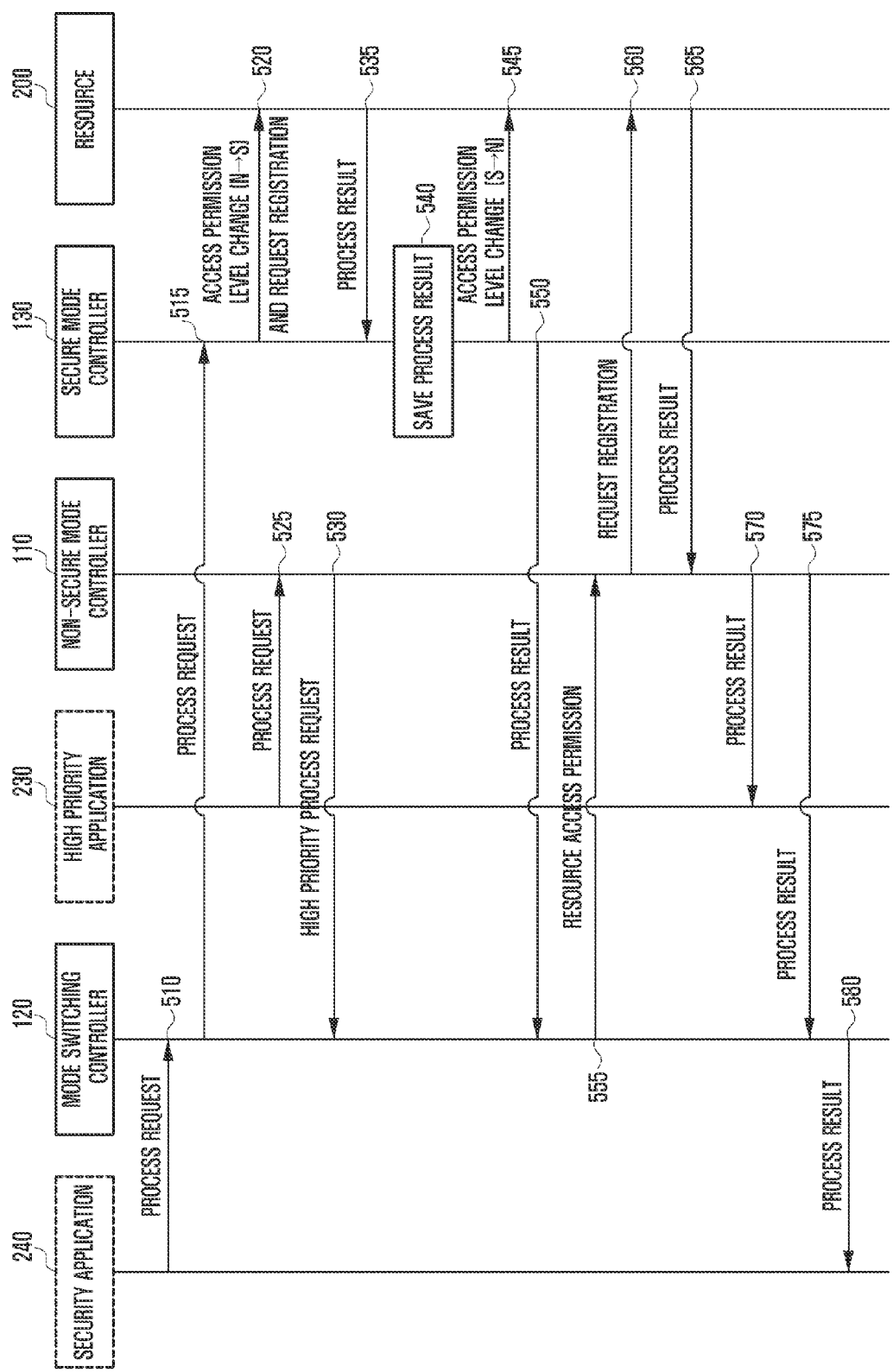
FIG. 5 is a signal flow diagram illustrating a procedure of processing a request of a high priority application with suspension of the request of a security application in an application execution method according to an embodiment of the present disclosure.

FIG. 5 is a signal flow diagram illustrating a procedure of processing a request of a high priority application with suspension of the request of a security application in an application execution method according to an embodiment of the present disclosure.

Referring to FIG. 5, the mode switching controller 120 receives the process request of the security application 240 at operation 510 and forwards the process request to the secure mode controller 130 at operation 515. The secure mode controller 130 changes the access permission level of the resource 200 from the non-secure mode (N) to the secure mode (S) and registers the request of the security application 240 at operation 520.

The non-secure mode controller 110 receives the process request from the high priority application 230 at operation 525. The non-secure mode controller 110 determines that the access permission level of the resource 200 to be used for processing the request is the level accessible in the secure mode and sends the process request of the high priority application 230 to the mode switching controller 120 at operation 530. However, if the success permission level of the resource 200 is the level accessible in the non-secure mode (N), the non-secure mode controller 110 may access the resource 200 to process the request without sending the process request to the mode switching controller 120.

Since the secure mode controller 130 is processing the request of the security application 240 at the level accessible in the secure mode (S), the mode switching controller 120 waits until the process is complete and the process result is received.

The secure mode controller 130 receives the process result from the resource 200 at operation 535, stores the process result at operation 540, and changes the access permission level to the level accessible in the non-secure mode (N) back at operation 545. Since the procedure of processing the request of the secure application 240 has been described with reference to the embodiment of FIG. 3, a description thereon is omitted here.

Thereafter, the secure mode controller 130 sends the mode switching controller 120 the process result of the secure mode application 240 at operation 550, the mode switching controller 120 notifies the non-secure mode controller 110 that the resource 200 is accessible to process the request of the high priority application since the access permission level of the resource 200 has been changed to the level accessible in the non-secure mode (N) at operation 555.

At this time, the mode switching controller 120 may determine the priority of the application generating the process request and, if the application is the high priority application 230, the mode switching controller 120 sends a response to permit the non-secure mode controller 110 to access the resource 200. However, if the application generating the request is a general application with a normal priority, the mode switching controller 120 ignores the request from the non-secure mode controller 110 to prevent the non-secure mode controller 110 from accessing the resource 200 until the request of the security application 240 is processed completely.

The mode switching controller 120 may send the non-secure mode controller 110 an access permission response to process the request of the high priority application 230.

Figure 6:
FIG. 6 is a diagram illustrating a screen display of a UI wherein a high priority application is executed in a state of processing a request of a security application in an application execution method according to an embodiment of the present disclosure.

FIG. 6 is a diagram illustrating a screen display of a UI wherein a high priority application is executed in a state of processing a request of a security application in an application execution method according to an embodiment of the present disclosure.

Referring to FIG. 6, if a telephony application needed to be processed urgently in the middle of receiving a user's touch input by means of a touch keypad presented on the screen as shown in FIG. 4, a dialog box is presented to notify of an incoming call so as to prompt the user to determine whether to accept the incoming call or continue processing the request of the high priority application 230.

If the UE selects 'OK' button on the dialog box, the mode switching controller 120 sends the non-secure mode controller 110 an access permission response for the resource 200 to receive the incoming call. Otherwise, if the user selects the 'cancel' button, the mode switching controller 120 ignores the process request in spite of the high priority of the telephony application such that the secure mode controller 130 continues processing the request of the security application 240.

Referring back to FIG. 5, if the permission response is received from the mode switching controller 120, the non-security mode controller 110 accesses the resource 200 to register the process request of the high priority application 230 at operation 560. If the resource 200 is a touch input means and if the process request is an incoming call accept/reject prompt, the non-secure mode controller 110 may prompt the user to determine whether to accept or reject the incoming call in registering the process request with the resource 200. The non-secure mode controller 110 may also register the touch position corresponding to an incoming call accept or reject command.

Thereafter, the process result on the request of the high priority application 230 is received from the resource 200 at operation 565, and the non-secure mode controller 110 sends the high priority application 230 and the mode switching controller 120 the process result at operations 570 and 575, respectively.

Upon receipt of the process result, if there is any request of the security application 240 to be processed, the mode switching controller 120 sends the secure mode controller 130 the process request to continue processing. Otherwise, if the process has completed, the mode switching controller 120 sends the security application 240 the process result at operation 580.

In a case where the process request received form the security application 240 needs a number of plural accesses to the resource 200, the mode switching controller 120 may permit the non-secure mode controller 110 to access the resource 200 after the requests of the security application 240 are processed completely at operation 555 or send the non-secure mode controller 110 the permission response after current access and use of the resource 200 are terminated.

For example, if the process request received form the security application 240 is the a 4-digit password input through the touch keypad as shown in FIG. 4, the mode switching controller 120 transfers the processing request four times for receiving the four digits independently as operation 515, and the secure mode controller 130 accesses the resource 200, i.e., touch keypad, 4 times to process the request of the security application completely.

If a process request of the high priority application 230 is generated in the state where the four-digit password input processing request is received from the security application, the mode switching controller 120 sends the secure mode controller 130 the process requests for respective digits of the password subsequently to receive the password and, if the password is received completely, sends the non-secure mode controller 110 the permission response.

However, by taking notice of the urgency of the process of the high priority application, if the request to the security mode controller 130 is processed completely, the mode switching controller 120 may send the permission response to the non-secure mode controller 110 regardless of the presence of a residual request to be processed, i.e., whether residual access times to the resource remain. Accordingly, the user may accept or reject an incoming call occurring in the middle of entering a password through the touch keypad for the financial transaction and resume the input of the password.

Whether to perform access to the resource several times for processing the request of the security application 240 entirely may be preconfigured in advance or reconfigured by the user.

In an embodiment of the present disclosure, if a request of the high priority application 230 is generated in the state of processing the request of the security application 240, the mode switching controller 120 may cancel the process of the security application 240 and start processing the request of the high priority application immediately.

Figure 7:
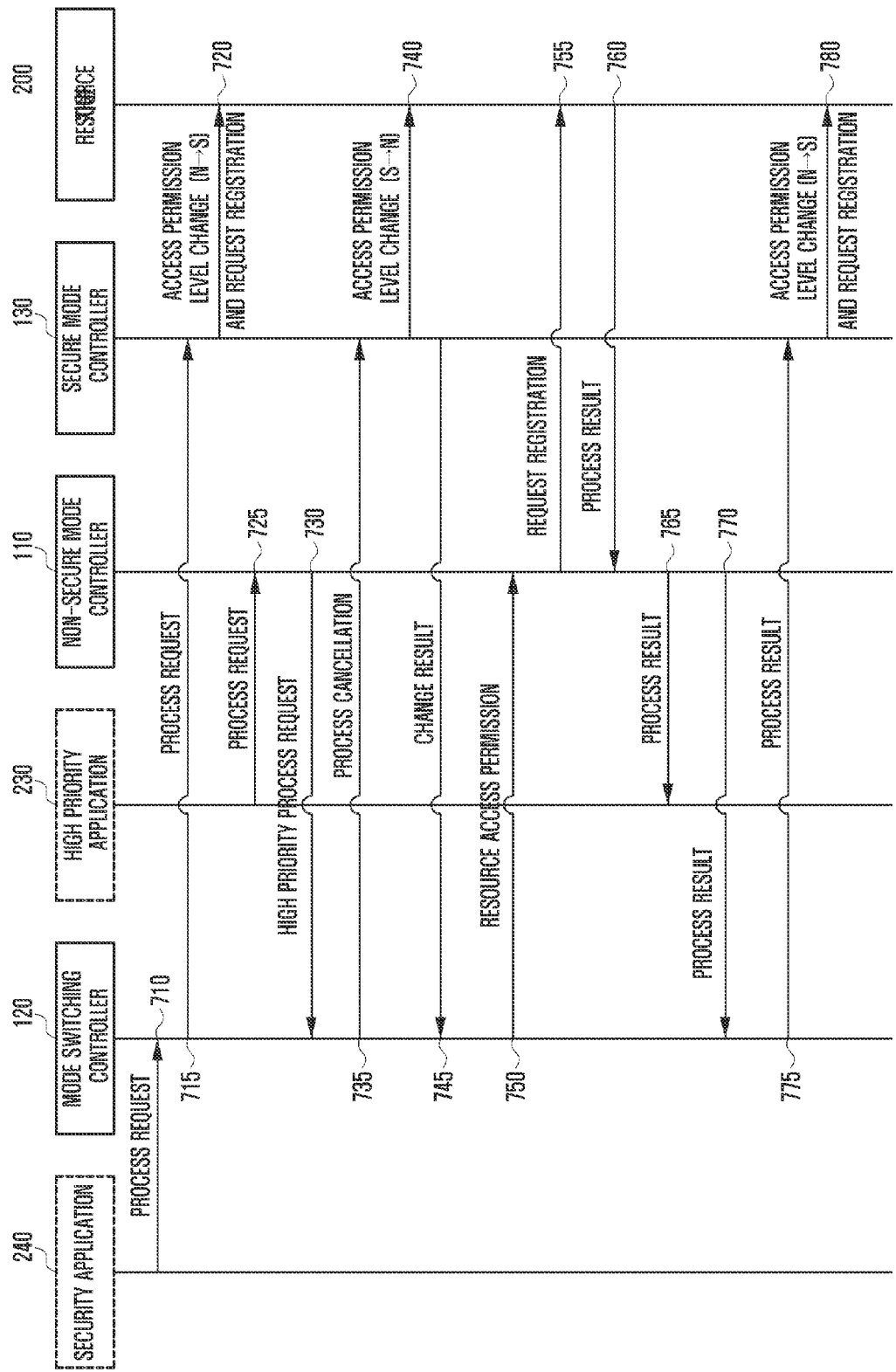
FIG. 7 is a signal flow diagram illustrating a procedure of processing a request of a high priority application with cancellation of the request of a security application in an application execution method according to an embodiment of the present disclosure.

FIG. 7 is a signal flow diagram illustrating a procedure of processing a request of a high priority application with cancellation of the request of a security application in an application execution method according to an embodiment of the present disclosure.

Referring to FIG. 7, the mode switching controller 120 receives a process request from the security application 240 at operation 710 and sends the process request to the secure mode controller at operation 715. The secure mode controller 130 changes the access permission level from the non-secure mode (N) to the secure mode (S) and registers the process request of the security application 240 at operation 720.

At this time, if a process request of the high priority application is received at operation 725, the non-secure mode controller 110 determines that the resource 200 is occupied by the secure mode controller 130 and sends the mode switching controller 120 a high priority process request to the mode switching controller 120 at operation 730.

Thereafter, the mode switching controller 120 sends the secure mode controller 130 a cancel command to cancel the request of the security application 240 at operation 735. At this time, the mode switching controller 120 may determine whether the previously received process request has been transmitted by the high priority application 230 before transmitting the cancel command. If the request has been transmitted by a normal low priority application, the mode switching controller 120 skips transmitting the cancel command and ignores the request from the normal application.

The secure mode controller 130 cancels the process request of the security application 240 which has been registered with the resource 200 and changes the access permission level of the resource 200 from the secure mode (S) to the non-secure mode (N) at operation 740. Thereafter, the secure mode controller 130 sends the mode switching controller 120 the change result at operation 745, and the mode switching controller 120 sends the non-secure mode controller 110 the access permission response at operation 750.

The non-secure mode controller 110 accesses the resource 200 to register the process request of the high priority application at operation 755 and receives the process result of the resource 200 at operation 760. Thereafter, the non-secure mode controller 110 sends the high priority application 230 and the mode switching controller 120 the process result at operation 765 and 770, respectively.

Since the process request of the security application 240 has been cancelled, the mode switching controller 120 sends the secure mode controller 130 the process result at operation 775, and the secure mode controller 130 changes the access permission level of the resource 200 from the non-secure mode (N) to the secure mode (S) and registers the process request at operation 780. A procedure of processing the request of the security application 240 is identical with the procedure described above.

In a case of canceling the process request of the security application 240 and processing the request of the high priority application 230, the user may select whether to process the request of the high priority application 230.

Figure 8:
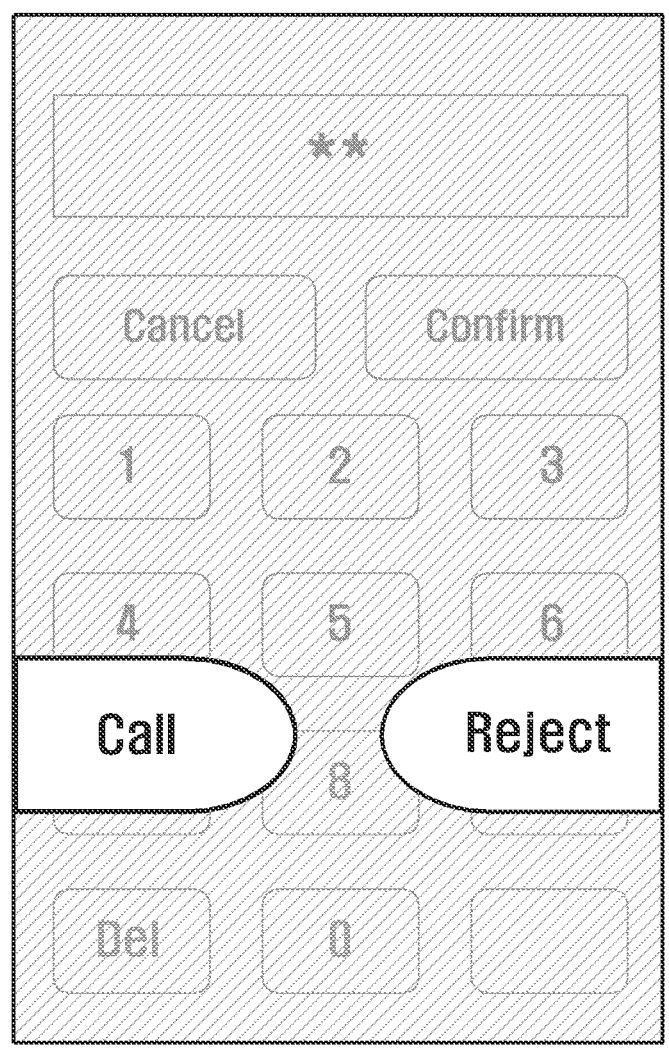
FIG. 8 is a diagram illustrating a screen display of a UI wherein a high priority application is executed in a state of processing a request of a security application in an application execution method according to an embodiment of the present disclosure.

FIG. 8 is a diagram illustrating a screen display of a UI wherein a high priority application is executed in a state of processing a request of a security application in an application execution method according to an embodiment of the present disclosure.

Referring to FIG. 8, if an incoming call is received in the middle of inputting a password for executing the security application 240, a selection button is presented on the keypad screen to prompt the user to input a selection command for determining whether to process the request of the high priority application 230.

If the user selects a 'call' button, the secure mode controller 130 cancels the process request of the security application 240 and processes the request of the high priority application 230, i.e., request for accepting the incoming call. In this case, the keypad may disappear on the screen to process the request of the security application 230.

Otherwise, if the user selects a 'reject' button, the mode switching controller 120 ignores the request of the high priority application 230 and does not transmit any cancel command such that the secure mode controller 130 continues processing the request of the security application 240.

In a case of using the resource 200 to process the secure mode in the secure mode domain 220 of the processor, it is possible to improve the user's convenience while maintaining application execution security by processing the high priority application running in the non-secure mode with priority.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for executing an application with a processor supporting a secure mode domain and a non-secure mode domain, the method comprising:
   receiving a request to be processed in the non-secure mode domain from the application;
   determining an access permission level configured to a resource used for processing the request; and
   in response to the determination that the access permission level allows for access only from the secure mode domain:
   determining a priority of the application,
   canceling, when the resource is occupied by the secure mode domain, resource occupancy of the secure mode domain;
   changing the access permission level to allow for access by the non-secure mode domain according to the priority of the application, and
   processing the request of the application using the resource in the non-secure mode domain.

2. The method of claim 1, wherein the changing of the access permission level comprises:
   waiting, when the resource is occupied by the secure mode domain, until resource occupancy of the secure mode region is released; and
   changing the access permission level.

3. The method of claim 2, wherein the changing of the access permission level comprises changing, when an application needing use of the resource plural times is executed, the access permission level of the resource regardless of remained times of use.

4. The method of claim 2, wherein the changing of the access permission level comprises changing, when an application needing use of the resource plural times is executed, the access permission level of the resource after the resource is used plural times by the secure mode domain.

5. The method of claim 1, wherein the changing of the access permission level comprises deleting, after cancelling the resource occupancy, data displayed on a display screen in correspondence to the application running in the secure mode region.

6. The method of claim 1, wherein the determining of the priority of the application comprises:

displaying data corresponding to the request on a display screen; and determining, when a command for processing the request is input, the priority of the application.

7. The method of claim 1, further comprising:

determining, after the processing of the request of the application, whether a secure request of a security application to be processed by the secure mode domain exists; and when the secure request of the security application to be processed by the secure mode domain exists:

changing the access permission level of the resource to allow for access by the secure mode domain, and processing the secure request of the security application using the resource by the secure mode domain.

8. The method of claim 1, wherein the resource comprises an input unit for receiving a touch input.

9. An apparatus for executing an application with a processor supporting a secure mode domain and a non-secure mode domain, the apparatus comprising:

a non-secure mode controller configured to:

receive an application request to be processed in the non-secure mode domain from the application, and in response to a determination that an access permission level allows for access only from the secure mode domain and an access permission response is received in response to a resource access request for access to a resource, process the application request using the resource in the non-secure mode domain; and a mode switching controller configured to:

in response to the determination that the access permission level allows for access only from the secure mode domain, determine a priority of the application, cancel, when the resource is occupied by the secure mode domain, resource occupancy of the secure mode domain, change the access permission level to allow for access by the non-secure mode domain according to the priority of the application, and transmit the access permission response to the non-secure mode controller.

10. The apparatus of claim 9, further comprising a secure mode controller configured to:

change the access permission level of the resource under the control of the mode switching controller, configure the access permission level of the resource accessible by the secure mode domain, and change, after end of the use of the resource by the secure mode domain, the access permission level to the extent accessible by the non-secure mode domain.

11. The apparatus of claim 10, wherein the secure mode controller is configured to change, when an application needing use of the resource plural times is executed, the access permission level of the resource regardless of remained times of use.

12. The apparatus of claim 10, wherein the secure mode controller is configured to change, when an application needing use of the resource plural times is executed, the access permission level of the resource after the resource is used plural times by the secure mode domain.

13. The apparatus of claim 9, further comprising a display unit configured to delete data displayed on a display screen in correspondence to the application executed by the secure mode domain after the resource used by the secure mode domain is cancelled.

14. The apparatus of claim 9, further comprising:

a display unit configured to display data corresponding to the application request received from the application on a display screen, wherein the mode switching controller is configured to determine, when a command for processing the application request is input, the priority of the application.

15. The apparatus of claim 9, further comprising:

a secure mode controller configured to:

change the access permission level of the resource under the control of the mode switching controller, wherein the mode switching controller is configured to:

when a processing result of the application request is received from the non-secure mode controller, determine whether a secure request of a security application to be processed by the secure mode domain exists, and when the secure request of the security application exists, send the secure request of the security application to the secure mode controller, and wherein the secure mode controller is configured to change the access permission level of the resource to allow for access by the secure mode domain and process the secure request of the security application using the resource by the secure mode domain.

16. The apparatus of claim 9, wherein the resource comprises an input unit configured to receive a touch input.

* * * * *